United States Patent [19]

Simon et al.

[11] 4,243,685

[45] Jan. 6, 1981

[54] PROCESS FOR THE PREPARATION OF FERMENTATION MEDIA SUITABLE FOR CULTURING YEAST FOR ANIMAL CONSUMPTION AND MICROSPORES AND/OR FOR THE PRODUCTION OF PROTEIN FROM VEGETABLE WASTE MATTER

[75] Inventors: Ágostón Simon; Zoltán Lengyel, both of Budapest, Hungary

[73] Assignee: Chincin Gyógyszer és Vegyészeti Termékek Gyara Rt., Budapest, Hungary

[21] Appl. No.: 919,982

[22] Filed: Jun. 28, 1978

Related U.S. Application Data

[63] Continuation-in-part of Ser. No. 689,345, May 24, 1976, abandoned.

[30] Foreign Application Priority Data

Jun. 2, 1975 [HU] Hungary ............................. CI 1581

[51] Int. Cl.³ ................................................ A23K 1/14
[52] U.S. Cl. ....................................... 426/53; 426/623; 426/626; 426/635; 426/636; 435/254; 435/255; 435/804

[58] Field of Search ....................... 426/49, 52, 53, 54, 426/60, 62, 626, 630, 623, 635, 636, 656; 435/255, 254, 804; 195/100; 260/112 R

[56] References Cited

U.S. PATENT DOCUMENTS

| 3,314,797 | 4/1967 | Hess et al. | 426/53 |
|---|---|---|---|
| 3,937,845 | 2/1976 | Han et al. | 426/53 |
| 3,958,015 | 5/1976 | Gay | 426/53 |
| 4,085,229 | 4/1978 | Staron | 426/53 |

FOREIGN PATENT DOCUMENTS 278818  10/1927  United Kingdom ..................... 426/53

*Primary Examiner*—R. B. Penland
*Attorney, Agent, or Firm*—Karl F. Ross

[57] ABSTRACT

A process for the preparation of fermentation media suitable for culturing yeast for animal consumption and microspores and/or for the production of protein from vegetable waste matter. Any vegetable matter containing a considerable amount of hemicelluloses, pentosans, pectins or other polysaccharides in addition to cellulose and not very suitable for direct feeding of animals is usable as starting material. Preferred representatives are: corn-cob and/or stalks, reeds, sunflower stalks, fallen autumn leaves. An animal food product made by the method is also disclosed.

2 Claims, No Drawings

PROCESS FOR THE PREPARATION OF FERMENTATION MEDIA SUITABLE FOR CULTURING YEAST FOR ANIMAL CONSUMPTION AND MICROSPORES AND/OR FOR THE PRODUCTION OF PROTEIN FROM VEGETABLE WASTE MATTER

CROSS REFERENCE TO RELATED APPLICATION

This application is a continuation in part of Ser. No. 689,345 filed May 24, 1976 now abandoned.

FIELD OF THE INVENTION

The present invention relates to a process for the preparation of fermentation media suitable for culturing yeast for animal consumption and microspores and/or for the production of protein from vegetable waste matter. It also relates to the production of animal feeds.

BACKGROUND OF THE INVENTION

Vegetable waste matters generally contain proteins in relatively low concentrations, the fibers thereof do not digest easily and they are, therefore, not suitable for a direct application for feeding purposes.

As the shortage of protein becomes more and more a world-wide problem, it is of increasing importance to exploit all possible sources of protein. A feasible solution is the production of yeast for animal consumption harnessing various sources of hydrocarbons and other sources providing microbiologically assimilable chemical energy. According to another solution protein is extracted from vegetable matter which cannot be used in any other way.

At present the sources providing microbiologically assimilable chemical energy can be divided into two groups. The first group includes various hydrocarbons or carbohydrates which are theoretically available in very large amounts. They have, however, a disadvantage, since in crude form they may contain carcinogenic materials which are very complicated and expensive to eliminate from the yeast product; on the other hand such hydrocarbons and carbohydrates are very expensive when purified.

The other group of raw materials includes waste materials of various agricultural or industrial processes (molasses, various types of washings, waste-liquors from starch and cellulose production). The quantity of these materials is, however, determined by the capacity of the relevant industry, and does not cover the present demands.

A raw material suitable for producing yeast for animal consumption may be produced in practically any amount by enzymatic or acid hydrolysis of starch or cellulose. The manufacture of starch is however, very expensive; on the other hand the hydrolysis of cellulose requires very expensive equipment and consumes large amounts of energy.

The so-called acid pre-hydrolysis is a well-known process in the production of sulphate cellulose, and essentially it consists of pre-hydrolyzing the raw material (wood, straw) with a dilute acid, whereby the hemicelluloses dissolve and in this way more than 10 percent of the raw material is dissolved as reducing substance. During the Second World War the fermentation of such pre-hydrolyzates by yeast was widely employed, but several years after the war the process proved to be uneconomical, and has remained so.

OBJECTS OF THE INVENTION

It is the object of the invention to overcome the described disadvantages, extend the principles of the earlier application and provide a process for culturing microorganisms which can make use of wastes as the raw materials.

SUMMARY OF THE INVENTION

The process provided by the present invention differs substantially from the aforementioned pre-hydrolysis in that, from various vegetable wastes as the main products, there are obtained partly acid hydrolysates suitable for culturing yeast for animal consumption, and partly alkaline extracts from which the overwhelming part of the protein content of vegetable raw materials can easily be separated preferably by acid treatment. The coagulated protein thereafter can be separated and used, for instance, for feeding purposes as feedstocks.

Adding various conventional fertilizers to the pure supernatant, which is practically free of protein, and adjusting the pH thereof to 4.0 to 5.0, a fermentation medium is obtained on which the cultivation of certain fungi, e.g. *Aspergillus niger,* can be effected with very good results.

In this way starting from 1 kg. (calculated for dry material content) of ensiled corn stalks (chopped corn silage) about 150 g. of a dry mycelium (containing about 3.5% of nitrogen) can be prepared, which corresponds to about 22% crude protein related to the starting dry substance content.

According to the process provided by the invention, vegetable wastes which in fact are not well suited for the manufacture of cellulose but contain compounds which are easy to decompose with a dilute acid in the markedly higher proportion (at least 10 to 30 percent) than wood and straw, can be advantageously utilized. Such materials include for example corn stalks and sunflower stalks. Especially the use of corn stalks is of outstanding importance since they are available is very large quantities.

The process of this invention represents significant technical advance over the known processes directed to the utilization of vegetable waste matter for the production of protein, see: Kralovanszky, U.P., Matrai, T.: Lecture on the III$^{rd}$ Fermentation Colloquium in Sopron (Oct. 2 to 4, 1974); Sarkov, V. I. Gidroliznoe proizvodstovo, 1945 (Goslesbumizdat); Komarova, L. T., Vasileva, K. A., Fiser, P. N.: Polutsenie belkogouglebodnogo korma iz selomi i kukuruznoj kotserizki (Srornik trudov Gos. Nautsn, Issled. Inta. Girodnoj y sulfitno-spirtovoj Prom. Tom XI.); and U.S. Pat. No. 3,314,797).

According to the invention, the process for the preparation of a fermentation medium suitable for producing yeast for animal consumption and microspores and/or proteins starting from vegetable waste matters, comprises starting with an exclusive or limited class of reduced vegetable matter containing polysaccharides, preferably corn stalks, sunflower, fallen autumn leaves, algae or reeds (excluding wood, sawdust and the like industrial wastes). Hydrolyzing this vegetable matter with a dilute aqueous solution of organic or inorganic acids, preferably sulphuric acid at 80° to 140° C., pH=1.5. The liquid phase is separated, adjusted to pH 3.0 to 6.0, supplemented with inorganic ammonium and phosphate compounds, preferably ammonium hydroxide or ammonium sulphate and potassium dihydrogenphosphate to give a ferementation medium suitable for producing yeast for animal consumption.

The solid phase obtained after the acid treatment or the reduced vegetable matter containing polysaccharides is boiled with a dilute base, preferably alkali metal hydroxide for 5 to 20 minutes: if desired, the alkaline boiling is repeated.

The solid and liquid phases obtained are separated from each other, the pH of the liquid phase is adjusted to 1.5.

The precipitate obtained, containing protein, is separated.

The pH of the mother liquor is adjusted to 3.0 to 6.0, it is supplemented with inorganic ammonium and phosphate compounds, preferably ammonium hydroxide or ammonium sulphate and potassium dihydrogenphosphate to give a fermentation medium suitable for culturing various fungi, and, if desired, it is combined with the fermentation medium prepared by acid hydrolysis as above.

The invention also includes a process for the preparation of fermentation media suitable for producing yeast for animal consumption and microspores and/or protein starting from vegetable waste matters, in which reduced vegetable matter (as defined above) polysaccharides, preferably corn stalks, sunflower, fallen autumn leaves, algae or reeds are boiled with a dilute base, preferably alkali metal hydroxide for 5 to 20 minutes. If desired, the alkaline boiling is repeated. The solid and liquid phases obtained are then separated from each other, the pH of the liquid phase is adjusted to 1.5, the precipitate obtained containing protein is separated, and the pH of the mother liquor is adjusted to 3.0 to 6.0. It is supplemented with inorganic ammonium and phosphate compounds, preferably ammonium hydroxide or ammonium sulphate and potassium dihydrogenphosphate, to give a fermentation medium suitable for culturing various fungi.

The method of producing an animal feed of the invention comprises hydrolyzing nonwood vegetable matter containing cellulose chains shorter than 1 mm and 10 to 30% polysaccharides with dilute aqueous acid to produce a hydrolyzate containing the cellulose unchanged, adding nitrogen and phosphate to said hydrolyzate in an amount sufficient to constitute of the same a medium for yeast-fungus growth, adjusting the pH of said medium to a value of 3.0 to 6.0, and cultivating a yeast fungus on the medium following step (c) to form an animal-feed substance.

The organic matter can be limited here to crushed cornstalks, sunflower, stalks, cereal parts and reed and the dilute acid is preferably sulfuric acid while the yeast fungus is a Candida. The hydrolysis is advantageously carried out at a pH of about 1.5 for a period of 120 to 160 minutes at a temperature of 80° to 140° C.

More specifically, the vegetable matter consists of collected and chopped-up corn stalks, which also can comprise leaves, and is boiled with a mineral acid of 0.2 to 5% by weight concentration, or with an organic acid, preferably with sulphuric acid of 1 to 2% by weight concentration, at 80° C. to 140° C., for 20 to 160 minutes depending on the temperature, and thereafter the product is filtered. To the filtrate, which is practically free of nitrogen, the usual sources of nitrogen and phosphate employed in yeast production, suitably ammonium hydroxide or ammonium sulphate and potassium dihydrogen-phosphate, are added, and the pH thereof is adjusted to 3.0 to 6.0. Then the desired fungal microorganism, preferably *Candida tropicalis*, is cultivated on the culture broth thus obtained, using conventional fermentative procedures.

Other fungal microorganisms besides *Candida tropicalis* grow satisfactorily on such a culture medium, as will be seen below, and our invention is not limited to the use of this microorganism. Since corn stalks contain not only hemicelluloses but also a considerable amount of pectin and related compounds which provide non-reducing compounds assimilable by some microorganisms after acid hydrolysis (e.g. glucuronic acid or galacturonic acid), it is expedient to select a microorganism which is able to assimilate such compounds.

The protein is extracted from the raw materials by boiling with a dilute alkali metal hydroxide solution (preferably with a sodium hydroxide solution of 0.1 to 1% by weight concentration) for 5 to 20 minutes. As a result of this treatment great part of the protein is dissolved from the vegetable raw material and can be precipitated from the solution together with other materials by adjusting the pH to 1 to 5. The obtained precipitate contains about 4% nitrogen, which corresponds to about 25% protein content. The digestion experiments carried out with pepsin, trypsin and erepsin showed that the nitrogen-containing material obtained was poorly digestible with pepsin but gave very good digestion results with trypsin and erepsin.

According to an especially preferred embodiment of the invention acid and alkaline treatments are performed successively. It has namely been found that the yield of the alkaline extraction of proteins is considerably increased when starting from a vegetable raw material which has previously been subjected to an acid treatment. According to the experimental results, yields are nearly doubled. It is preferred to separate the solid phase from the residue obtained after acid digestion for example by centrifugation or filtration, and to transform the liquid phase into a fermentation medium suitable for yeast production as described above. The separated solid phase is then subjected to alkaline digestion.

We do not limit our invention to the utilization of the vegetable wastes mentioned before; any vegetable matter containing a considerable amount of hemicelluloses, pentosans, pectins or other polysaccharides in addition to cellulose and not very suitable for direct feeding of animals is usuable within the scope of our invention. Corn-cob and/or stalks, reeds, sunflower stalks, fallen autumn leaves generally are suitable. Unsorted mixtures of these vegetable wastes can also be used, which is a further advantage of our invention.

The following Examples are given by way of illustration only.

EXAMPLE 1

Ground corn-cob (1 kg) was mixed with water (5 l), concentrated sulphuric acid (50 ml) was added and the mixture was boiled in an autocalve at 120° C. for one hour.

After filtration and washing, 6 l of hydrolyzate were obtained containing 2.9% of reducing materials (expressed as the equivalent quantity of glucose). The hydrolyzate was diluted to twice its volume with water and 1% of 10 weight percent ammonium hydroxide solution was added. The solution was neutralized with sodium hydroxide to a pH in the range 3–6 and 100 ml portions of the culture broth thus prepared were inoculated with various fungi.

The inoculated fermentation media were shaken on a shaker in 500 ml. Erlenmeyer flasks at 28° C. for three days. The cultured microorganisms were filtered off, dried and weighed. For the various species the following dry-weight values were obtained per 100 ml of culture:

| | |
|---|---|
| Rhizopus nigricans | 0.90 g |
| Botrytis cinerea | 0.80 g |
| Aspergillus niger | 0.92 g |
| Aspergillus flavus | 0.71 g |
| Penicillium cyclopium | 0.50 g |
| Rhodotorula glutinis | 0.55 g |
| Rhodotorula rubra | 0.40 g |
| Candida tropicalis | 0.60 g |
| Candida mycoderma | 0.41 g |
| Candida parapsilosis | 0.68 g |
| Candida catenulata | 0.55 g |
| Saccharomyces cerevisiae | 0.37 g |
| Saccharomyces pastorianus | 0.26 g |
| Koeckera apiculata | 0.37 g |
| Schizosaccharomuces pombe | 0.33 g |

Many other species were also tested, but those giving values smaller than 0.20 g are not listed here.

On the evidence above, the genus Candida gives among the best results of the "protophytic" fungi.

EXAMPLE 2

Chopped corn stalks (400 g) together with their leaves were mixed with water (6.1), concentrated sulphuric acid (60 ml) was added, the mixture was boiled at 120° C. for one hour, and the hydrolyzate was filtered. 5130 ml of filtrate product was obtained containing reducing substances equivalent to 1.1% of glucose.

0.5% of ammonium sulphate and 0.1% of potassium hydrogen phosphate were added to the hydrolysate and the pH-value was adjusted to 4.5. Then it was inoculated with a culture of Candida tropicalis.

The inoculated material was added in portions of 100 ml to 500 ml Erlenmeyer flasks and shaken at 28° C. for 48 hours. Thereafter the cultured microorganisms were filtered, dried and the air-dry biomass was weighed. The experiment was continued by successive inoculating for three generations. The weight of the biomass in the first generation was 1.19, and in the third one 1.63 g (per 100 ml).

EXAMPLE 3

Two mixtures were made up, each from chopped corn stalks (400 g) together with their leaves, water (6000 ml) and concentrated sulphuric acid (20 ml). After one hour of steeping the pH-value settled to 1.5. One of the mixtures was boiled at 120° C. for 90 minutes, and the other at 100° C.

After filtration, the first material contained 1.23% and the second one 0.76% reducing material edxpressed as the equivalent proportion of glucose.

Culture broths were prepared from both filtrates as described in Example 2 and inoculated with Candida tropicalis. The cultivation was carried out in accordance with Example 2. 0.875/100 ml of air-dry biomass was obtained from the first fermentation broth, and 0.923 g/100 ml from the second one.

EXAMPLE 4

Dry, chopped corn stalks (300 g) were boiled in sodium hydroxide solution of 0.2 w/v% (0.28/100 ml).

The liquid phase was separated and the solid residue was subjected to the above alkaline treatment subsequently twice, using fresh sodium hydroxide solution for each treatment. The obtained liquid phases were combined and the pH thereof was adjusted to 1.5 with hydrochloric acid solution. The precipitous liquid was allowed to stand at room temperature. Thereafter the supernatant was discharged, the precipitate centrifuged, washed to neutral with water and subsequently dried. 7.6 g of a dark powder were obtained containing a 3.85% of nitrogen corresponding to 0.61% yield of protein related to the dry weight of the starting substance.

EXAMPLE 5

Dry, chopped corn stalks (300 g) identical with the starting substance used in the Example 4, were boiled with a sulphuric acid solution of 2 w/v% under 1 atm. over-pressure and the acid solution was filtered. The filtrate product contained reducing substances equivalent to 19.3% of glucose related to the starting substance. After dilution and neutralization with sodium hydroxide as described in Example 1, a fermentation medium suitable for culturing yeast was obtained.

The solid residue obtained during the acid treatment was neutralized, boiled with a sodium hydroxide solution of 0.2 w/v% for 15 minutes and finally filtered. The alkaline treatment was repeated two more times as described above, using fresh sodium hydroxide solution for each treatment. The three filtrates obtained were combined and adjusted to pH 1.5 with hydrochloric acid.

Upon acidification a downy precipitate was obtained. The precipitous mixture was allowed to stand at room temperature overnight, the pure supernatant was discharged and the precipitate centrifuged, washed to neutral with water, centrifuged again and finally dried. 20 g of a product were obtained containing 4.17% of nitrogen. This value corresponds to a 2.52% protein yield related to the starting substance in form of a composition containing 26 w/v% (g/100 ml of solution) protein.

EXAMPLE 6

Powdered, dry eucalyptus leaves (53.5 g) from the waste of volatile oil production were boiled with a sulphuric acid solution of 2 w/v% at 100° C. for one hour. The acid hydrolyzate was filtered. The filtrate contained 6.8% of reducing materials (expressed as the equivalent quantity of glucose) related to the starting material. The solid was neutralized and boiled with a 0.2% sodium hydroxide solution for 15 minutes. The slurry obtained during the alkaline treatment was filtered and the solid obtained was subjected to two subsequent alkaline treatments carried out as described above. The filtrates obtained in the three alkaline digestion steps were combined and adjusted to pH 1.5 with a hydrochloric acid solution. The precipitate obtained was allowed to settle down, centrifuged and dried. 4.05 g of a solid product containing 2.4% of nitrogen were obtained. The crude protein content calculated on the basis of the nitrogen concentration corresponds to 11.2% of the starting substance. The crude protein concentration of the product obtained was 15% (calculated from the nitrogen content).

EXAMPLE 7

Various vegetable wastes (400–400 g each) were subjected to acid hydrolysis carried out with sulphuric acid as described in Example 2. The percentage amounts of the reducing substances expressed as the glucose equivalent were obtained, calculated for air-dry material:

| | |
|---|---|
| sunflower stalks ( - deseeded heads) | 11.9% |
| horse-chestnut leaf | 11.6% |
| platan leaf | 12.0% |
| eucalyptus leaf (freed from volatile oils) | 6.8% |
| reed grass (from lake Balaton) | 4.0% |
| green fibrous algae | 2.4% |
| beet root slice (dry) (by-product from sugar production) | 30.0% |

The hydrolyzate obtained provide Candida yeast in a quantity equivalent to the reducing substance concentration.

EXAMPLE 8

The procedure described in Example 5 was followed with the difference that the pure supernatant of the precipitous liquid obtained by acidifying the alkaline extract was not discharged, instead its pH was adjusted to 4.5. Then it was supplemented with fertilizers usual in culturing fungi, preferably with ammonium hydroxide or ammonium sulphate and potassium dihydrogensulphate and inoculated with the *Aspergillus niger* strain. From the aired, dipped culture a reach product was obtained within 48 hours. The cultured microorganisms were filtered off, dried and weighed. 14.6% of mycelia were obtained calculated for the starting substance. Nitrogen content: 3.5% corresponding to 22% crude protein.

We claim:

1. A process for the preparation of fermentation media suitable for producing yeast for animal consumption and/or proteins starting from a vegetable waste matter, comprising the steps of:

(a) hydrolyzing comminuted vegetable waste matter containing polysaccharides and selected from the group which consists of cornstalks, sunflower stalks, leaves, algae and reeds with a dilute aqueous solution of sulfuric acid at a pH of about 1.5 and at a temperature of about 80° to 140° C., separating the resulting liquid phase, adjusting the separated liquid phase to a pH of 3.0 to 6.0, and supplementing the liquid phase with an effective amount of a compound selected from the group which consists of ammonium hydroxide or ammonium sulfate and potassium dihydrogen phosphate as inorganic ammonium phosphate nutrients to give a fermentation medium suitable for producing yeast for animal consumption;

(b) boiling the solid phase obtained after the acid hydrolysis of the comminuted vegetable matter with a dilute alkali-metal hydroxide base for 5 to 20 minutes, and repeating this alkaline boiling step at least once;

(c) separating the solid and liquid phases obtained in step (b) from each other;

(d) adjusting the pH of the separated liquid phase obtained in step (c) to about 1.5 to obtain a precipitate containing protein which is separated from the mother liquor, and recovering the separated protein;

(e) adjusting the pH of the mother liquor to 3.0 to 6.0; and (f) supplementing the mother liquor with effective amounts of inorganic ammonium and phosphate compounds suitable for culturing fungi and combining said fermentation medium of step (a) therewith.

2. A process as defined in claim 1, further comprising the step of culturing a yeast for animal feed on the fermentation medium of step (a) as combined in step (f).

* * * * *